Oct. 16, 1956

O. A. CARNAHAN 2,766,769

FLOAT ACTUATED VALVE

Filed April 21, 1955

O. A. CARNAHAN  Inventor

By Cushman, Darby & Cushman

2,766,769
FLOAT ACTUATED VALVE

Orson A. Carnahan, Syracuse, N. Y.

Application April 21, 1955, Serial No. 502,897

3 Claims. (Cl. 137—436)

This invention relates to new and useful improvements in valve structure, and, more particularly, to valves adapted for float operation with means for minimizing the sound during the admission of water to a tank or other similar receptacle, and means for preventing siphoning away the stored water in the event of an interruption in the supply means. Such valves have, in the past, had a direct metallic connection with the supply conduits, thereby permitting amplification and transmission of sounds generated by the flow of water through the valve.

It is, therefore, an object of this invention to provide an improved valve structure constructed with a valve body or housing formed in part of sound absorbing material.

Another object of this invention is to provide an improved valve mechanism wherein such mechanism is entirely separated from the supply conduit by a sound insulating medium.

A still further object of this invention is to provide an improved float actuated valve structure which prevents water from siphoning back from the tank to the supply line in case of failure of the supply pressure.

Yet another object of this invention is to provide an improved valve structure which is formed of relatively few parts and may be easily and quickly disassembled for inspection or repair.

Another object of this invention is to provide an improved valve structure to which the supply pipe may be attached from any angle.

Still a further object of this invention is to provide an improved valve structure that may be so installed that no part of the valve or supply pipe touches the water in the tank.

Figure 1:
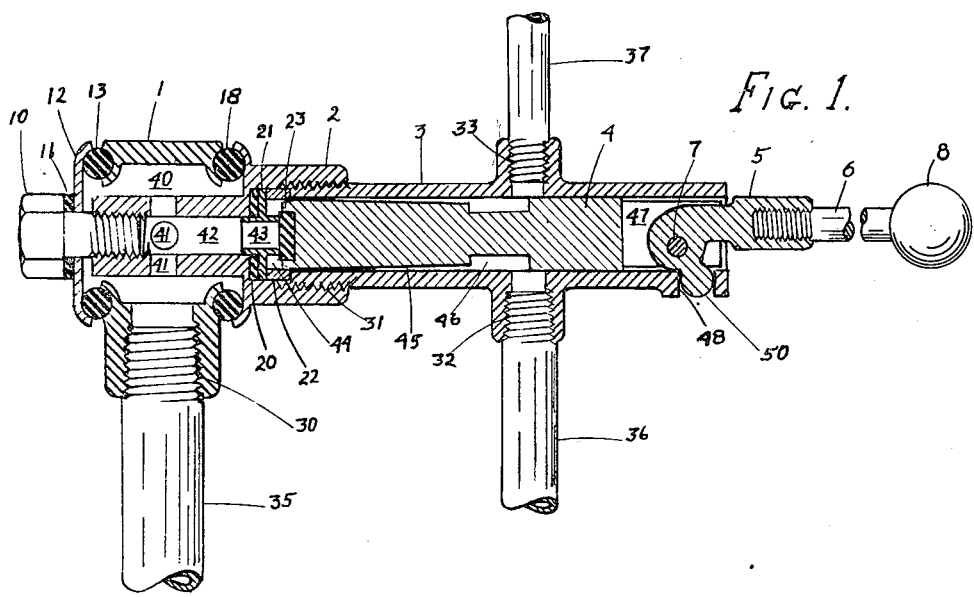
Figure 2:
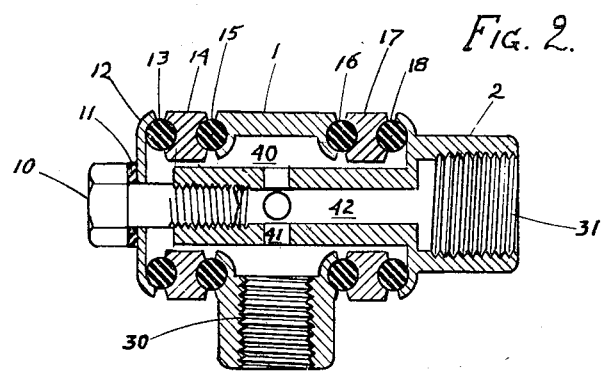

Other objects and advantages of this invention will be apparent from the following description and accompanying drawings, in which:

Figure 1 is a cross-sectional elevation of the improved float actuated valve structure; and Figure 2 is a cross-sectional elevation of a modified form of the valve structure shown in Figure 1, wherein a greater number of sound absorbing elements are used.

The valve structure shown in Figure 1 comprises a valve stem guide 3, a valve stem 4 which is slidably mounted within valve stem guide 3, a valve seat housing 2, a generally cylindrical-shaped silencing chamber housing 1 and a closure plate 12. Silencing chamber housing 1 has a radially threaded inlet opening 30 formed in its wall, to which a supply pipe 35 is connected. As will be noted from the drawing, the edges of housing 1 are formed with arcuately curved portions which act as retaining members for the insulating gaskets 13 and 18. These insulating gaskets may be made of any type of material which will act to interrupt the transmission of sound, rubber or the like being used in the preferred embodiment.

Mounted on and acting to hold insulating gasket 13 in position is a closure plate 12 which, when secured in assembled position, acts to prevent the escape of water from the interior of housing 1 to the atmosphere. A bolt 10 extends through closure plate 12 and is detachably secured to the longitudinal projection on the forward side of valve seat housing 2. To aid as a further deadening means and to prevent the leakage of fluid around the shank of the bolt, a standard flat sealing washer 11 has been placed between the head of bolt 10 and closure plate 12. Thus, by tightening bolt 10 into the appropriate internal threads provided in the forward projection of valve seat housing 2, the housing 2 is drawn tight against insulating gasket 18, thereby binding parts 1, 2 and 12 into a single compact unit. Since silencing chamber housing 1 and, consequently, radially threaded inlet opening 30 are freely movable prior to the tightening of bolt 10, it is obvious that housing 1 and supply pipe 35 are not restricted to a single absolute position relative to the valve structure. Such versatility is of great convenience to the person making the connection since it eliminates the necessity for making multiple bends to insure proper positioning of the valve structure. In addition to the internal threads formed on the inner surface of the forward projection of valve seat housing 2 is a series of circumferentially arranged apertures 41 which permit fluid from supply pipe 35 to enter into central passageway 42, which passageway connects with central aperture 43 of valve seat 21, as later described.

Mounted within valve seat housing 2 is a valve seat gasket 20 and, resting upon gasket 20, a valve seat 21; the valve seat having a central aperture 43 through which incoming fluid may flow. Disposed upon valve seat 21 is an annular valve sleeve 22 which, when valve stem guide 3 is screwed into housing 2, acts to maintain valve seat 21 in axially abutting relationship with valve seat gasket 20. Sleeve 22 has an internal diameter less than valve stem guide 3, but slightly greater than the forward end of valve stem 4.

A valve 23 is secured to the forward end of valve stem 4 to act as a closure for valve seat aperture 43 of valve seat 21. This valve can, of course, be constructed of any material which will give firm and snug sealing engagement with the valve seat.

Valve stem guide 3, in addition to being threaded into valve seat housing 2, has a pair of threaded outlet openings 32 and 33, opening 32 permitting water to pass into a reservoir, through tank filler pipe 36, and opening 33 to which is attached a bowl filler pipe 37. Formed adjacent the open end of valve stem guide 3 is a cam-receiving aperture 48 which acts as a bearing point for cam 50. Cam arm 5, and cam 50 which are pivotally mounted off center line of valve stem 4, as at 7, in slot 47 of valve stem 4, is utilized to effecutate reciprocatory motion of valve stem 4 within valve stem guide 3. The offset mounting of cam 50 increases the mechanical advantage of the cam action allowing a more positive closing of the valve. The small angle formed by the contact between cam 50 and valve stem guide 3, the pivot 7, and float supporting arm 6, still further increases the force exerted on valve 23 when in the closed position. An ordinary ball-type float 8 is attached to the end of arm 6 to effect movement thereon upon any change in the reservoir.

It will be noted that the valve stem 4 is provided with an annular channel 46 and that, while the rearmost portion of said stem has an external diameter equal to the interior diameter of valve stem guide 3, that portion of the stem extending forwardly from the channel to the valve is of a smaller diameter. The forward portion of valve stem 4 which adjoins valve 23 is only slightly less than the internal diameter of annular valve sleeve 22. When valve 23 is in wide open position the supply pressure in chamber 44 acts on the end area of valve stem 4. As valve 23 closes, however, the pressure in chamber 44 decreases, due to leakage between valve stem 4 and annular valve sleeve 22. The supply pressure in central aperture 43 then acts on valve 23 which is of much less area than the end of valve stem 4. The force which was required to overcome the pressure in chamber 44 now acts on the smaller area of central aperture 43 and valve 23 to make a quick and positive valve closure. As is readily apparent from the drawing, the diameter of valve stem 4 becomes increasingly smaller approaching annular channel 46 so that annular passage 45 is necessarily larger at its rear than it is at its forward end.

Detachably secured to cam arm 5 is a further sound deadening means in the form of float supporting arm 6. This arm is preferably constructed of non-sound conducting material to insure that any sound originating in the valve structure will not be transmitted through the arm to the water and on to the water-containing structure.

In the modified design illustrated in Figure 2 the valve seat housing 2 is provided with internal threads 31 and central passageway 42 in the same manner as in Figure 1. The difference between the two structures is the provision of a second pair of insulating rings 15 and 16 and spacing washers 14 and 17. Thus, the structure illustrated in Figure 2 contains twice the amount of sound-deadening material and therefore lessens the transmission of sound through the system.

In use, fluid will enter chamber 40 from supply pipe 35 and flow through radial holes 41 into the central passageway 42 and, when the valve is opened, through central aperture 43. This valve is automatically operated whenever the water level in the reservoir (not shown) drops sufficiently for the float 8 to operate upon cam arm 5 through float supporting arm 6. When this occurs, cam arm 5 moves downwardly, cam 50 pushes against the forward edge of cam receiving aperture 48, pulling valve stem 4 rearwardly. This action moves valve 23 away from valve seat 21 and permits the water to enter chamber 44 from central aperture 43 and flow into annular channel 46 through the annular passage 45. From channel 46 the water flows outwardly through pipes 36 and 37 to their predetermined desinations. Conversely, it is equally as apparent that when the reservoir is full, the pressure of the float 8 upon float supporting arm 6 will tend to maintain valve stem 4 and valve 23 in tight sealing engagement with valve seat 21. As previously stated, the rearmost portion of valve stem 4 is in close sliding relationship with the inner surface of valve stem guide 3. This close fit is very helpful in eliminating any potential vibration or chattering which might arise as a consequence of water flow around the forward portion of the stem.

In the past, the failure of water pressure has permitted a siphoning away of water previously stored. This evil has been eliminated by placing the valve structure above the water level in the tank. In the event of a failure of water pressure in the supply pipe 35, air will be admitted through bowl filler pipe 37 so that water can not be sucked up from the tank through tank filler pipe 36 even if the end of pipe 36 has been extended below the water level in the tank. If so desired, this valve structure including the supply pipe 35 and tank filler pipe 36 may be placed above the water level in the tank.

Although a specific embodiment of the invention is shown and described, it will be realized that the embodiment described is subject to various structural modifications without departing from the spirit of the invention. Therefore, the scope of the invention is as set forth in the following claims.

I claim:

1. A valve structure for a water closet tank comprising: a reciprocable valve stem comprising an inner portion of generally frusto-conical shape and an outer portion of generally cylindrical shape, said inner and outer portions being separated by an annular channel; a valve attached to the inner end of said stem; float means connected to the outer end of said stem for operating the valve; an elongated guide member surrounding said stem and having outlet openings in the walls thereof; a valve seat detachably secured to one end of said guide member for coaction with said valve; and a longitudinally extending passageway permitting fluid flow between said stem and said guide to permit fluid to reach such channel and said outlet openings, the cross-sectional area of said passageway becoming increasingly larger as it approaches said annular channel.

2. In combination with the structure of claim 1, silencing means comprising: a valve seat housing having a rearwardly extending tubular projection, said valve seat housing being connected to said guide; a generally cylindrical-shaped housing into which said tubular projection extends and having an inlet opening in the wall thereof; an insulating ring interposed between said seat housing and said cylindrical housing; a closure plate positioned adjacent one side of said cylindrical housing; an insulating ring separating said cylindrical housing from said closure plate and fastening means extending through said closure plate into detachable engagement with said tubular projection to maintain the assembly in a unitary arrangement.

3. In combination with the structure of claim 1, silencing means comprising: a valve seat housing having a rearwardly extending tubular projection; said valve seat housing being connected to said guide; a generally cylindrical-shaped housing into which said tubular projection extends and having an inlet opening in the wall thereof; a closure plate positioned adjacent one side of said cylindrical housing, means separating said cylindrical housing from said valve seat housing and from said closure plate, said means including pairs of insulating rings, spacing rings holding the insulating rings apart and holding said rings in position; and fastening means extending through said closure plate into detachable engagement with said tubular projection to maintain the assembly in a unitary arrangement.

References Cited in the file of this patent

UNITED STATES PATENTS

| | | |
|---|---|---|
| 969,874 | Jennings | Sept. 13, 1910 |
| 1,783,410 | Cowell | Dec. 2, 1930 |
| 1,787,601 | Swanberg | Jan. 6, 1931 |
| 2,318,428 | Skinner | May 4, 1943 |
| 2,328,898 | Goff | Sept. 7, 1943 |
| 2,587,032 | Delaney et al. | Feb. 26, 1952 |
| 2,646,248 | Cornelius | July 21, 1953 |
| 2,671,469 | Carnahan | Mar. 9, 1954 |